United States Patent [19]

Hyodo et al.

[11] Patent Number: 4,871,413
[45] Date of Patent: Oct. 3, 1989

[54] APPARATUS FOR MANUFACTURING TUBULAR LINING MATERIAL

[75] Inventors: Masakatsu Hyodo; Koji Kusumoto; Isaburo Yagi, all of Osaka, Japan

[73] Assignee: Ashinori Industry Co., Ltd., Osaka, Japan

[21] Appl. No.: 178,883

[22] Filed: Apr. 5, 1988

Related U.S. Application Data

[60] Continuation of Ser. No. 852,211, Apr. 15, 1986, abandoned, which is a division of Ser. No. 703,908, Feb. 21, 1985, abandoned.

[51] Int. Cl.[4] .............................................. B29C 47/02
[52] U.S. Cl. ................................. 156/382; 156/244.14; 156/244.21; 156/287; 156/390; 156/436; 264/511; 264/516; 264/173; 425/113; 425/504; 425/133.1; 425/393
[58] Field of Search ............... 264/173, 514, 174, 136, 264/511, 516, 560–568; 156/244.14, 244.15, 498, 500, 287, 436, 382, 390, 244.21; 425/504, 505, 509, 516, 113, 114, 393, 133.1

[56] References Cited

U.S. PATENT DOCUMENTS

| | | | |
|---|---|---|---|
| 2,820,249 | 1/1958 | Colombo | 425/113 |
| 2,990,577 | 7/1961 | De Laubarede | 425/114 |
| 3,049,762 | 8/1962 | Jackson | 425/114 |
| 3,106,748 | 10/1963 | Skobel | 425/71 |
| 3,310,447 | 3/1967 | Matthews | 264/171 |
| 3,336,176 | 8/1967 | Medney | 156/244.14 |
| 3,384,520 | 5/1968 | Hutchinson | 264/103 |
| 3,437,537 | 4/1969 | Takada | 156/393 |
| 3,503,828 | 3/1970 | Walter | 425/113 |
| 3,533,133 | 10/1970 | Meitinger | 425/71 |
| 3,561,493 | 2/1971 | Maillard et al. | 425/133.1 |
| 3,737,261 | 6/1973 | Hardesty | 425/113 |
| 4,101,699 | 7/1978 | Stine et al. | 264/173 |
| 4,195,054 | 3/1980 | Verellen et al. | 264/558 |
| 4,196,464 | 4/1980 | Russell | 264/173 |
| 4,214,934 | 7/1980 | Upmeier et al. | 264/514 |
| 4,334,943 | 6/1982 | Zenbayashi et al. | 156/287 |
| 4,368,091 | 1/1983 | Outsuga et al. | 156/287 |
| 4,371,415 | 2/1983 | Tanaka | 425/516 |
| 4,386,628 | 6/1983 | Stanley | 264/514 |

FOREIGN PATENT DOCUMENTS

| | | | |
|---|---|---|---|
| 50-1593 | 1/1975 | Japan | 264/173 |
| 1052884 | 12/1966 | United Kingdom | 264/514 |

Primary Examiner—Jeffery Thurlow
Attorney, Agent, or Firm—Birch, Stewart, Kolasch & Birch

[57] ABSTRACT

A tubular lining material and a method and apparatus for manufacturing same, the tubular lining material being suitable for reinforcing pipe lines and comprising a tubular textile jacket having on the external surface thereof a coating of plural synthetic resins in the form of laminated layers, characterized in that the outermost layer of the coating is composed exclusively or predominantly of a thermoplastic polyester elastic resin and the innermost layer of the coating is composed exclusively or predominantly of a thermoplastic polyurethane elastic resin, the coating having been bonded superficially onto the external surface of the tubular textile jacket. The tubular lining material is manufactured by simultaneously extruding plural synthetic resins in an annularly layered form superficially onto the external surface of the tubular textile jacket, using an apparatus provided with an annularly arranged multiple extruders. The tubular lining material is significantly improved in flexibility and adhesion to the tubular textile jacket.

6 Claims, 5 Drawing Sheets

APPARATUS FOR MANUFACTURING TUBULAR LINING MATERIAL

This application is a continuation, of application Ser. No. 852,211 filed on Apr. 15, 1986 abandoned, which is a div. of Ser. No. 703,908 2/21/86 now U.S. Pat. No. 4,600,615 issued July 15, 1986.

BACKGROUND OF THE INVENTION

1. Field of the Invention

The present invention relates to a tubular lining material for pipe lines which comprises a tubular textile jacket overlaid superficially on the external surface thereof with air-impervious plural coatings of flexible synthetic resins having strongly been bonded to the textile jacket and to a method and apparatus for manufacturing same. More particularly, the present invention relates to a tubular lining material for pipe lines, especially underground pipe lines already constructed, which comprises a tubular textile jacket made of warps and a weft knitted or woven in a tubular form superficially overlaid with air-impervious plural coatings of flexible synthetic resins having strongly been bonded to the textile jacket and to a method and apparatus for manufacturing same wherein a combination of synthetic resins is suitably selected and a specific device is made for simultaneous extrusion and bonding of plural synthetic resins superficially but strong onto the external surface of the tubular textile jacket.

2. Description of the Prior Art

In the past, a tubular textile jacket which is normally a fabric having been woven with warps and a weft in a tubular form was coated on the external surface thereof with a latex of natural rubber or a synthetic resin and then turned inside out in the open air to manufacture a fire hose. In a typical method for manufacturing such fire hose comprised a series of continuous steps of dipping a tubular textile jacket reeled off from a supply reel into a bath of an emulsion of a latex or a synthetic resin, drying the tubular textile jacket while being kept in an inflated state to form a coating of a latex of natural rubber of a synthetic resin on the external surface of the jacket and thereafter turning the tubular textile jacket inside out in the open air by applying a pressurized fluid to the interior space of the jacket to form a fire hose having a resinous coating on the inner surface thereof. The most advantageous method of this type, for example, a method disclosed in U.S. Pat. No. 4,020,790 is still utilized for the manufacture of fire hose.

In recent years, such tubular textile jacket with a coating of a synthetic resin on the external surface thereof has been utilized as a lining material for pipe lines, especially underground pipe lines such as gas conduits, city water pipe lines, petroleum pipe lines, sewage pipes made of concrete or porcelain and pipe lines enclosing power transmission wires or telecommunication cables. In case of such underground pipe lines, their superannuation or damage often causes dangerous leakage of combustible fluids or electricity and unexpected burst of water, thus resulting in accidents and traffic disturbance. Only one effective countermeasure taken in the past to prevent such troubles was to dig up the superannuated or damaged pipe lines over the length in the order of several ten or hundred meters for replacing them with new ones. During this pipeexchange work, people encounter a great deal of trouble since supply of gas or city water or fuels is discontinued and even traffic is limited where the pipe lines are buried below the public roads. In such a case, enormous labor and cost are required for the pipeexchange work in addition to the difficulty in the work itself. Thus, development of such a pipe-lining material and a method for applying it to underground pipe lines attracts commercial interest because there no longer is the necessity of digging up the pipe lines already constructed. A method for lining pipe lines with such resin-coated tubular textile jacket as a tubular lining material has been hitherto improved several times. A typical improvement now advantageously utilized is disclosed. For example, U.S. Pat. No. 4,334,943 discloses passing such a tubular lining material through a pipe line and evaginating it within the pipe line under fluid pressure while bonding the evaginated tubular lining material onto the inner surface of the pipe line by the aid of a binder with or without using a leading rope-like material. Said material has previously been passed through the tubular lining material beyond its full length and is drawn from the opposite end of the pipe line. It has been found, however, that the tubular textile jacket with a coating of a synthetic resin on the external surface thereof which can be manufactured according to a method as disclosed in U.S. Pat. No. 4,020,790 is not suitable as a tubular lining material for the above pipelining method. According to the method described in this patent, a tubular textile jacket is dipped in a bath of an emulsion of a latex or a synthetic resin whereby the emulsion is penetrated deeply into the interstices of the fabric structure and is solidified in the subsequent drying step to harden the textile jacket. It is difficult to evaginate the hardened tubular textile jacket within a narrow space, i.e. a pipe line under normal fluid pressure. If the fluid pressure is elevated to strengthen the force necessary for evagination, the tubular lining material may often be damaged or stress may be formed therein under such high pressure.

With the improvements made in the pip-lining methods, some improvements have also been made in tubular lining materials themselves. Thus, a tubular lining material used in the pipelining method described in U.S. Pat. NO. 4,334,943 is a textile jacket woven in a tubular form with warps and a weft made of polyester yarns and having on the external surface thereof a coating of a polyester resin. The synthetic resin used in this tubular lining material is generally a thermoplastic polyester elastic resin such as Pelprene (Toyobo, Japan) or Hytrel (DuPont, U.S.A.) while the binder is preferably a commercially available thermocurable epoxy resin. As the polyester elastic resin possesses both strength and flexibility, this tubular lining material can provide a strong and satisfactory inner backing for the pipe lines. However, a problem exists in this polyester resin with respect to cohesion to the epoxy binder and to the textile jacket made of polyester yarns.

In general, what is needed for the tubular lining material is that it must be impregnated with a sufficient amount of a binder before the lining treatment but must easily be evaginated under a relatively weak fluid pressure so that the lining material can be bonded, after evagination, strongly onto the inner surface of a pipe line to form an integrally solidified reinforced textile pipe line within the pipe line as if the reinforced textile jacket were regarded as a second pipe line formed within the pipe line treated. In particular, the following properties are requested for the coating of a synthetic resin:

(1) To be flexible (The coating should be flexible for maintaining flexibility of the lining material. The hardness or the coating is preferably soft enough to assure evagination of the tubular lining material or less than 95 in terms of Shore A hardness.)
(2) To have a sufficient tensile strength
(3) To possess stretchability
(4) To be lower in frictional resistance between the coatings and to be better in anti-abrasion resistance
(5) To be excellent in the resisting properties against chemicals, solvents, water and fungi
(6) To be heat-resistant
(7) Not to degrade against a binder to be used
(8) To show good cohesion between the coating and the binder after curing of the binder
(9) To be easily moldable (As an extrusion molding method is usually utilized to form a coating of a synthetic resin on the external surface of the tubular textile jacket, the synthetic resin is required to have good moldability.)
(10) To show good adhesion to the tubular textile jacket by extrusion molding.

As the thermoplastic polyester elastic resin cannot be applied onto the external surface of a tubular textile jacket according to the so-called dipping method wherein the jacket is dipped in a bath of an emulsion or solution of the resin and then dried, tubular lining materials employed in the current pipelining methods as disclosed in U.S. Pat. Nos. 4,334,943, 4,368,091, 4,350,548 and 4,427,480 are manufactured by applying the elastic resin onto the tubular textile jacket according to an extrusion molding method wherein the resin is extruded while hot onto the external surface of the tubular textile jacket in inflated state. The thermoplastic polyester elastic resin such as Pelprene or Hytrel substantially satisfies the above requirements (1)–(7) and (9) and is generally preferred as a coating on the tubular textile jacket. It may not be difficult to improve the adhesion of the polyester resin to the tubular textile jacket. When the resin is extruded under high pressure onto the surface of the textile jacket on extrusion molding, the resin is forced to penetrate deeply in interstices of the fabric structure of the textile jacket whereby the resin is strongly bonded to the textile jacket by the so-called anchoring action. However, this device bears on the other hand such a disadvantage that the resin deeply intruded into the textile jacket is solidified to damage flexibility of the lining material and gives no sufficient space in the jacket for absorbing a necessary amount of a binder. The tubular lining material having poor flexibility cannot easily be evaginated within a pipe line unless the fluid pressure be elevated, and cannot be bonded firmly onto the inner surface of the pipe line when impregnated with an insufficient amount of the binder. At present, a new type synthetic resin of excellent coating characteristics has not yet been developed which can be substituted for the thermoplastic polyester elastic resin now suitably used as a resinous coating on the tubular textile jacket made of polyester yarns.

Under these circumstances, there is a technical subject for improving adhesion of the thermoplastic polyester elastic resin to the textile jacket and also a great demand for developing a new tubular lining material having on the external surface thereof a coating of a synthetic resin which satisfies all of the above requirements (1)–(10) and can strongly be bonded to the textile jacket without any sacrifice of its flexibility and complete adhesion of the lining material to the inner surface of the pipe line.

BRIEF SUMMARY OF THE INVENTION

Accordingly, it is an object of the present invention to provide a tubular lining material which overcomes the above mentioned disadvantages which is provided on the external surface thereof with a coating of a combination of the suitably selected synthetic resins in layers superficially but strongly bonded to the textile jacket of the lining material.

It is another object of the present invention to provide a method of manufacturing a tubular lining material with a coating of a combination of the suitably selected synthetic resins in layers superficially but strongly bonded onto the external surface thereof by a specific simultaneous multiple extrusion molding technique.

It is still another object of the present invention to provide an apparatus for manufacturing a tubular lining material with a coating of a combination of the suitably selected synthetic resins in layers superficially but strongly bonded onto the external surface thereof which comprises a specifically designed multiple extruder.

Other objects, features and advantages of the present invention will become apparent more fully from the following description.

DETAILED DESCRIPTION OF THE INVENTION

As a result of the present inventor's study for developing a tubular lining material which overcomes all the drawbacks seen in the prior art tubular lining materials, it has now been found surprisingly that such drawbacks can entirely be overcome by applying a coating of a combination of the suitably selected synthetic resins in layers, e.g. a coating of a synthetic resin composed predominantly of a thermoplastic polyester elastic resin as the outer layer and a synthetic resin composed predominantly of a thermoplastic polyurethane elastic resin as the inner layer in place of a coating of the thermoplastic polyester elastic resin alone, onto the external surface of the tubular textile jacket according to a specific simultaneous extrusion molding technique to form a tubular lining material provided on the external surface thereof with a coating of a combination of the suitably selected synthetic resins in layers.

In accordance with one embodiment of the present invention, there is provided a tubular lining material for pipe lines which comprises a tubular textile jacket having on the external surface thereof a coating of plural synthetic resins in the form of laminated layers, characterized in that the outermost layer of the coating is composed predominantly of a thermoplastic polyester elastic resin and the innermost layer of the coating is composed predominantly of a thermoplastic polyurethane elastic resin, the coating having been bonded superficially onto the external surface of the tubular textile jacket.

In accordance with another embodiment of the present invention, there is provided a method for manufacturing a tubular lining material for pipe lines which comprises pulling a tubular textile jacket downwardly at a constant speed through an annular extrusion head having multiple extruders with downwardly opened nozzles at the front end thereof each in an annular shape capable of extruding plural thermoplastic synthetic resins simultaneously around the external surface of the descending tubular textile jacket inflated at the front end of the extrusion heads to a cylindrical form by way of a mandrel having an outer diameter substantially equal to or slightly smaller than the inner diameter of the tubular textile jacket and being mounted to a hollow evacuation shaft having been inserted thereinto, downwardly extruding the plural thermoplastic synthetic resins simultaneously in the form of laminated layers from the nozzles evenly onto the external surface of the tubular textile jacket, evacuating the interior of the tubular textile jacket in a portion downstream of the mandrel through the hollow evacuation shaft while maintaining the tubular textile jacket in inflated form thereby holding the synthetic resins in the form of laminated layers superficially on the external surface of the tubular textile jacket, and thereafter allowing the synthetic resins to be solidified by passing the tubular textile jacket through a cooling medium.

In accordance with still another embodiment of the present invention, there is provided an apparatus for manufacturing a tubular lining material for pipe lines which comprises a means for pulling a tubular textile jacket downwardly at a constant speed, an annular extrusion head having multiple extruders each with a downwardly opened annular nozzle at the front end thereof arranged in an annularly layered form capable of extruding plural synthetic resins in the form of laminated layers on the external surface of the tubular textile jacket, a mandrel located on the central axis of the apparatus and spaced from the annular nozzles which has an outer diameter substantially equal to or slightly smaller than the inner diameter of the tubular textile jacket, a means for evacuating the interior of the tubular textile jacket in a portion downstream of the mandrel tip and having a device located in the downstream portion of the tubular textile jacket for maintaining it in inflated form, and a means for solidifying the synthetic resins in the form of laminated layers coated on the tubular textile jacket.

It has been found that a thermoplastic polyurethane elastic resin has good compatibility with the thermoplastic polyester elastic resin and shows good adhesion to the tubular textile jacket especially knitted or woven in a tubular form with warps and a weft each made of polyester yarns and also to an epoxy type binder. Thus, the adhesion of the thermoplastic polyester resin to the tubular textile jacket and to the binder is markedly improved by interposing a thermoplastic polyurethane elastic resin between the thermoplastic polyester elastic resin and the tubular textile jacket. The tubular lining material of the present invention is therefore characterized by having on the external surface thereof a coating of plural synthetic resins in the form of laminated layers, the outermost layer being composed predominantly of the thermoplastic polyester elastic resin and the inner most layer being composed predominantly of the thermoplastic polyurethane elastic resin. In the simplest case, the resinous coating consists of two layers, the outer layer being composed exclusively or predominantly of the thermoplastic polyester elastic resin and the inner layer being composed exclusively or predominantly of the thermoplastic polyurethane elastic resin. For further improving mutual adhesion between such outer layer and such inner layer, a small proportion of the thermoplastic polyurethane elastic resin can be incorporated into the outer layer while a small proportion of the thermoplastic polyester elastic resin may be incorporated into the inner layer. If necessary, one or more intermediate layer composed of the thermoplastic polyester elastic resin and the thermoplastic polyurethane elastic resin in various proportions may be interposed between the outer layer composed exclusively or predominantly of the thermoplastic polyester elastic resin and the inner layer composed exclusively or predominantly of the thermoplastic polyurethane elastic resin.

The present invention can more fully be understood from the following description taken in conjunction with the accompanying drawings in which.

Figure 1:
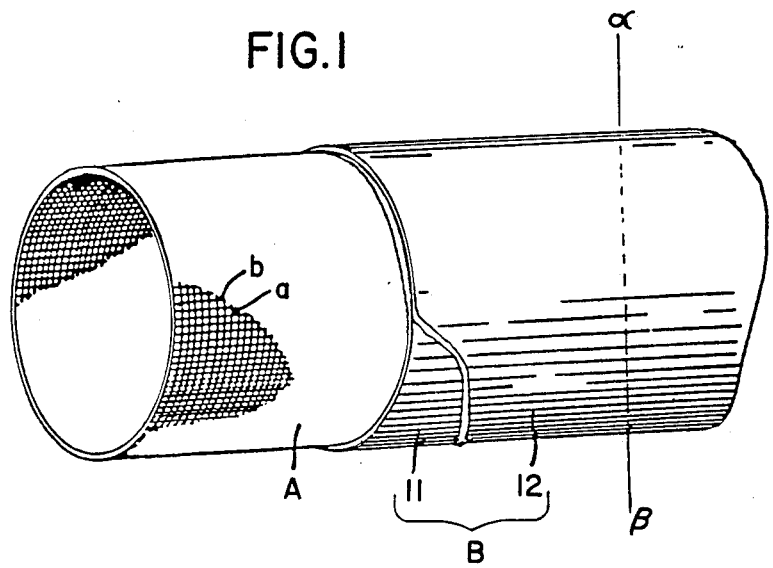
FIG. 1 is a schematic partially broken perspective view of one example of the tubular lining material of the present invention having two laminated layers of synthetic resins on the external surface thereof.

Referring first to FIG. 1, a tubular textile jacket A woven in a tubular form with warps a and a weft b has on the external surface thereof a resinous coating B which is composed of an outer layer 12 and an inner layer 11 each composed of a different synthetic resin. In general, the warps and the weft are respectively made of polyester yarns possessing flexibility and strong tenacity. In principle, the outer resinous layer is composed exclusively or predominantly of a thermoplastic polyester elastic resin and the inner resinous layer is composed exclusively or predominantly of a thermoplastic polyurethane elastic resin for attaining strong adhesion of the resinous layers to the tubular textile jacket.

Figure 2:
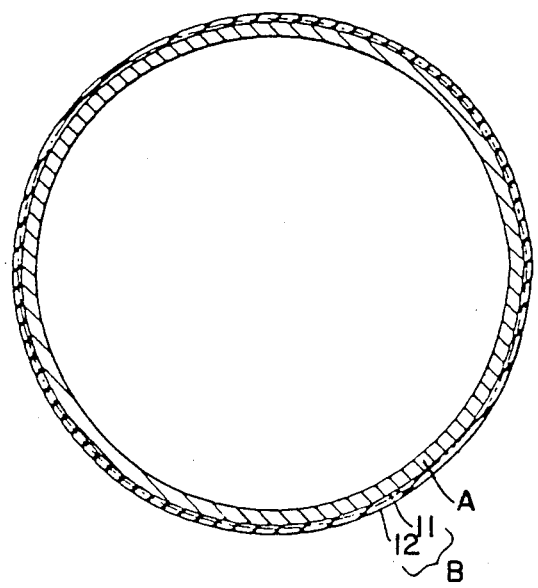
FIG. 2 is a schematic section view of the tubular lining material shown in FIG. 1 cut along the line $\alpha\text{-}\beta$.

In FIG. 2 showing the cross section of the tubular lining material shown in FIG. 1 cut along the line $\alpha\text{-}\beta$, the tubular textile jacket A is usually manufactured by weaving warps and a weft each made of synthetic yarns in a tubular form. Used as the warps are generally polyester multifilament yarns or crimped yarns. Used as the weft is generally a spun yarn made of polyester, polyamide or a blend of such synthetic fibers. Twisted yarns of polyester multifilament yarns or crimped yarns and polyester spun yarns are also preferably used as the weft. The use of polyester yarns is preferable since they are resistant to heat and chemicals and possess high tenacity. The tubular textile jacket has on the external surface thereof a resinous coating composed of at least two layers of synthetic resins. The thickness of the resinous coating B varies according to the intended purpose and size or inner diameter of the pipe lines to be treated, but is usually within the range from about 0.2 mm to about 0.8 mm, preferably from 0.3 mm to 0.6 mm. In FIG. 2 showing the case of the coating B composed of the two layers 11 and 12, the ratio in thickness of the outer layer 12 to the inner layer 11 is usually within 1:1 to 2:1. In case the coating is composed of three or more layers, the ratio in thickness of these layers may be equal but the outermost layer composed usually of a thermoplastic polyester elastic resin is preferably thicker than the other layers. In general, the inner layer/layers function as intermediate layer/layers for improving adhesion of the outer layer to the tubular textile jacket and may thus be thin so far as the desired improvement in the adhesion be achieved thereby.

A thermoplastic polyurethane elastic resin is preferably used as the inner resinous layer, which is derived from a diisocyanate and a polyol or glycol. Illustrative of the diisocyanate is, for example, 4,4'-diphenylmethanediisocyanate, 4,4'-dicyclohexylmethanediisocyanate and hexamethylene diisocyanate. On the other hand, examples of the polyol include polyethylene adipate, poly(1,4-butylene) adipate, polycaprolactone and polytetramethylene glycol and examples of the glycol include ethylene glycol, 1,4-butanediol, 1,6-hexanediol and bishydroxyethoxybenzene. A thermoplastic polyurethane elastic resin of a polyol type derived from a combination of 4,4'-diphenylene diisocyanate and 1,4-butanediol is particularly suitable because of its excellent anti-fungi property and hydrolysis-resisting property.

It has been found that the use of a thermoplastic polyurethane elastic resin of an incomplete thermoplastic type, i.e. one having a molar ratio in the NCO ingredient/the OH ingredient (or R value which is a ratio of —NCO/—OH) of 1.05-1.3, is preferable for the present invention. A polyurethane resin of such incomplete thermoplastic type has —NCO groups in the terminal ends of the molecule and forms crosslinked bridges by the reaction between the urethane bonds and unreacted isocyanate groups caused by the action of heat or water. Thus, adhesion to the tubular textile jacket and peeling strength are enhanced. Various polyurethane resins of such incomplete thermoplastic type are commercially available from Nihon Elastoran Co., Japan under the trade name of Elastoran (e.g. Elastoran E 375). As this polyurethane resin is so strong in adhesion to the tubular textile jacket, it attains the desired effect even in case of being applied superficially onto the textile jacket.

A thermoplastic polyester elastic resin used as the resin constituting the outer layer is a block copolymer containing an aromatic polyester as a hard segment thereof and either or both of an aliphatic polyether and and aliphatic polyester as a soft segment thereof.

The aromatic polyester used as the hard segment is a polycondensate of an acid and a glycol. Examples of the acid include aromatic dicarboxylic acids such as terephthalic acid, isophthalic acid, orthophthalic acid and naphthalenedicarboxylic acid. Examples of the glycol include aliphatic or cycloaliphatic glycols with 2-12 carbon atoms such as ethylene glycol, 1,3-propanediol, 1,4-butanediol and 1,6-hexanediol.

The aliphatic polyether used as the soft segment is preferably a polymer of an alkylene oxide with 2-10 carbon atoms, which has an average molecular weight of 400-6000. Illustrative of such polymer is, for example, block polymers or random copolymers of ethylene glycol and propylene glycol, polyethylene glycol, polypropylene glycol, polytetramethylene glycol and hexamethylene glycol. These polymers can be used singly or as a mixture. The aliphatic polyester used as thesoft segment is a polyester such as polyethylene adipate, polytetramethylene sebacate of a polyester of a dimeric acid and an alkylene glycol, and also includes aliphatic copolymeric polyesters derived from said mixtures and glycol mixtures. These polyesters can be used singly or as a mixture. A polylactone such as poly(epsiloncaprolactone), polyvalerolactone or the like may also be used.

Among these thermoplastic polyester elastic resins, a block copolyester-polyether derived from terephthalic acid, 1,4-butanediol and polytetramethylene glycol and containing 80% by weight of the polyether component is preferable and has a 50% modulas of 25 Kg/cm, a tensile strength of 180 Kg/cm and an elongation on breaking of 800% when measured according to the testing method of JIS K-6301. The use of a thermoplastic polyester elastic resin containing a polyester derived from terephthalic acid or naphthalenedicarboxylic acid and 1,4-butanediol as a hard segment thereof and polytetramethylene glycol as a soft segment thereof is most preferable in the present invention. Such resins are commercially available from Toyobo Co., Japan under the trade name of Pelprene (e.g. Pelprene 150M and Pelprene P40B or P40H). These resins are also excellent in moldability on extrusion, hydrolysis-resisting property, water-resistance and anti-fungi property. If desired, liquid paraffin, wax or graphite may be added to these thermoplastic polyester elastic resins to minimize their frictional resistance. In this case, the amount of such additive may not influence the characteristic properties of the polyester resins.

As described hereinbefore, the thermoplastic polyester elastic resin usually constituting the outer layer may be incorporated with a small proportion of the thermoplastic polyurethane elastic resin while the thermoplastic polyurethane elastic resin usually constituting the inner layer may be incorporated with a small proportion of the thermoplastic polyester elastic resin, thereby improving the compatibility of these resins and the adhesion of the thermoplastic polyester elastic resin to the textile jacket. In a preferable embodiment, the resinous coating can be composed of the three layers; the outermost layer composed exclusively or predominantly of the thermoplastic polyester elastic resin, the intermediate layer composed of an equiproportion of the thermoplastic polyester elastic resin and the thermoplastic polyurethane elastic resin and the inner most layer composed exclusively or predominantly of the thermoplastic polyurethane elastic resin. In such multilayer structure, adhesion of the resinous coating to the tubular textile jacket is satisfactorily improved and no delamination occurs. It has been found that the tubular lining material of such double to triple layer structure is found to satisfy all of the requirements for the lining materials and is excellent in flexibility as compared with the conventional prior art tubular lining materials. This is ascribable to the fact that the tubular lining material of the present invention contains a thermoplastic polyurethane elastic resin which is almost equivalent in hardness but has a low modulas on weak stretching as compared with the thermoplastic polyester elastic resin. The thermoplastic polyurethane elastic resin also shows good adhesion to an epoxy type binder, probably due to the fact that the polyurethane resin having an R value of 1.05-1.3 is reactive to the amine ingredient of the epoxy type binder. Thus, the tubular lining material of the present invention can easily be evaginated within a pipe line because of its excellent flexibility and does not permit the formation of any pinhole in the resinous coating.

Such technical advantage results apparently from the selection of a combination of specific synthetic resins as a resinous coating and from a specific structure of the laminated coating on the textile jacket. This specific structure is formed by a unique resin-extrusion technique wherein a viscous liquid flow of the thermoplastic polyester and polyurethane elastic resins is superficially attached onto the external surface of the tubular textile jacket. As the resins are not penetrated deeply into the interstices of the fabric structure, the tubular textile jacket fully retains its good flexibility. In addition, the resinous coating is strongly bound with the textile jacket and with the binder even if the resinous coating is superficially applied onto the external surface of the tubular textile jacket because of excellent adhesion brought about by the thermoplastic polyurethane elastic resin used in the inner layer of the resinous coating.

The synthetic resins above mentioned may be incorporated with a small amount of other polymers, antioxidants, modifiers, fillers, colorants and the like additives known in this art so far as the incorporation of such additive does not affect the characteristics of the synthetic resins.

Figure 3:
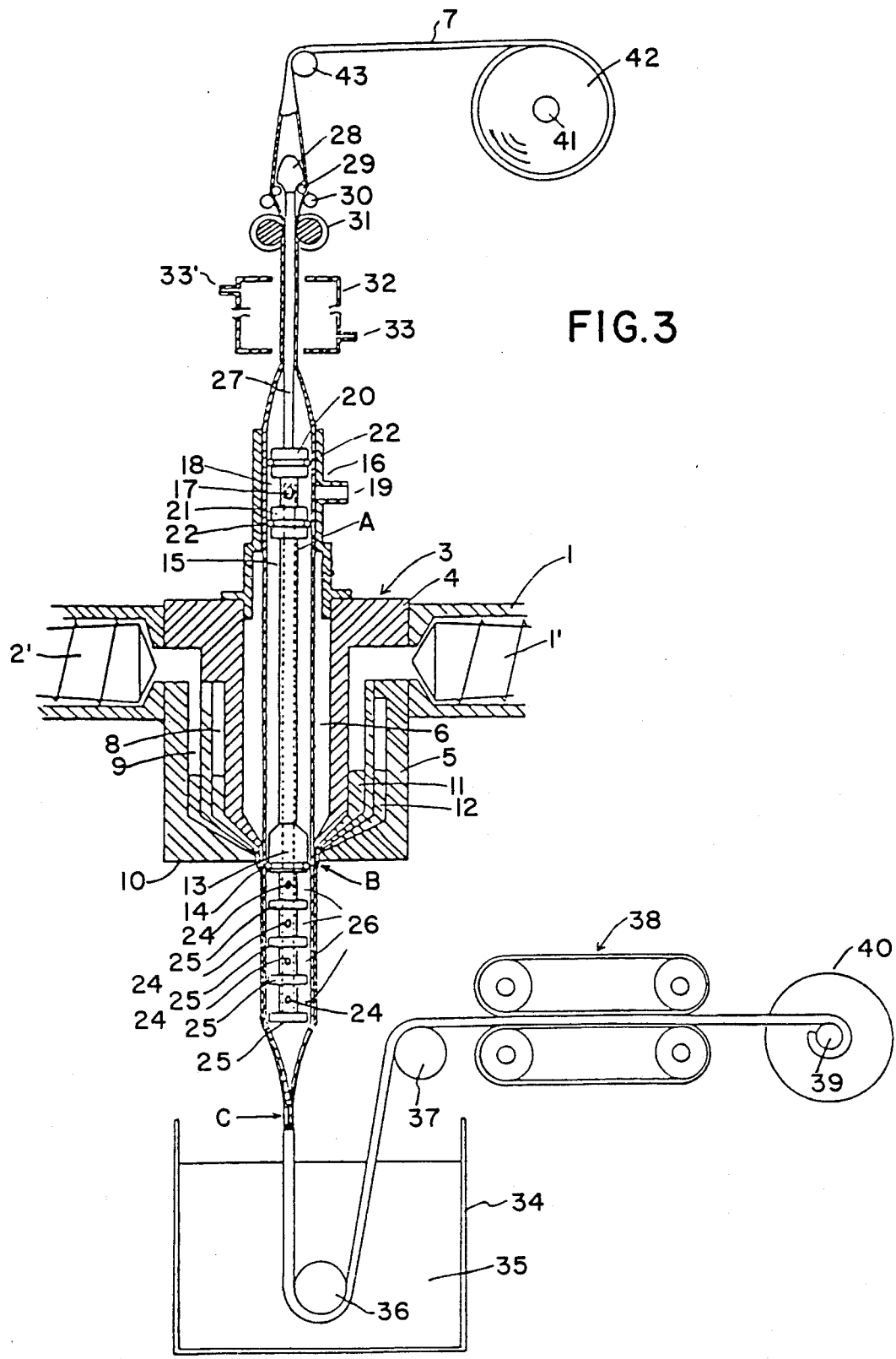
FIG. 3 is a schematic elevation of an example of the apparatus of the present invention for manufacturing the tubular lining material as shown in FIG. 1.

The tubular lining material having on the external surface thereof a coating of plural synthetic resins in the form of laminated layers can be manufactured according to the method using an apparatus as shown in FIG. 3.

In FIG. 3 showing an example of the apparatus of the present invention for manufacturing a tubular lining material having on the external surface thereof a coating of two synthetic resins in the form of laminated layers, the essential part of which is shown in section in an enlarged scale, an extrusion device 1 for a thermoplastic polyurethane elastic resin for forming an inner layer and an extrusion device 2 for a thermoplastic polyester elastic resin for forming an outer layer has a common extrusion head 3 which is vertically positioned and connected to the devices 1 and 2. The extrusion head 3 includes inner and outer cylindrical members 4 and 5, the inner cylindrical member 4 being provided at its center with an axially extending cavity 6 a lower end of which has a reduced diameter equal to or slightly larger than the outer diameter of a tubular textile jacket 7, an axially extending annular passage 8 defined by the inner and outer members 4 and 5, the passage 8 being communicated as its upper end with the extrusion device 1, another annular passage 9 concentrically extending in the outer member 5, and the passage 9 being also communicated at its upper end with the extrusion device 2. There is further defined an annular extrusion nozzle 10 between the lower ends of the inner and outer members 4 and 5, the annular nozzle 10 being radially spaced away with a slight distance from the reduced lower end of the cavity 6 and communicated with the passages 8 and 9, the arrangement being such that the thermoplastic polyurethane elastic resin 11 and the thermoplastic polyester elastic resin 12 are simultaneously extruded from the devices 1 and 2 into the passages 8 and 9, respectively, when extrusion screws 1' and 2' are operated at the same time, and are then discharged from the nozzle 10 as a laminar flow onto the external surface of the tubular textile jacket 7 downwardly passing through the lower end of the cavity 6 whereby a coating of the thermoplastic polyurethane elastic resin 11 and the thermoplastic polyester elastic resin 12 in the form of laminated layer is formed on the external surface of the tubular textile jacket 7.

In the lower end portion of the cavity 6 is located a cylindrical mandrel 13 having an outer diameter substantially equal to or slightly smaller than the inner diameter of the tubular textile jacket 7. The mandrel chip 13 is provided at its lower end with an O-ring 14 sealingly engaged with the tubular textile jacket 7. Extending vertically through the mandrel 13 is a hollow shaft 15 which is positioned at its upper end in an evacuation device 16 sealingly mounted onto the extrusion head 3. The upper end of the shaft 15 is formed with a radial hole 17 through which the inner axial space of the shaft 15 is communicated with an inner space 18 of the evacuation device 16 and further through a port 19 with a suitable vacuum pump (not shown). The space 18 of the device 16 is defined by a pair of axially spaced sealing discs 20 and 21 which are laterally mounted onto the shaft 15, each of the sealing discs being provided at its outer periphery with an O-ring 22 sealingly engaged with the textile jacket 7. It should be noted that a portion A of the textile jacket 7 descending in the device 16 and the head 3 is not yet coated with the resins so that a gaseous fluid or air can freely flow through apertures formed in the fabric structure of the textile jacket 7.

A lower end of the shaft 15 is downwardly extended beyond the mandrel 13 and formed with a plurality of axially spaced radial holes 24. The shaft 15 is also provided there with a plurality of axially spaced discs 25 for defining spaces 26 within a portion b of the tubular textile jacket 7 of which the outer surface has just been coated with laminated layers of the thermoplastic synthetic resins 11 and 12. The discs 25 have an outer diameter substantially equal to that of the mandrel 13. Each space 26 is evacuated through the corresponding hole 24, the inner space of the shaft 15, the hole 17 and the port 19. A rod 27 extends upwardly from the upper end of the hollow shaft 15 and is provided at its upper end with a holder 28 in a bullet form. A pair of rollers 29 is rotatably mounted on a shoulder portion of the holder 28 and supported externally by a pair of rollers 30. Just below the rollers 30, there is provided a pair of feed rollers 31 for feeding the tubular textile jacket 7 downwardly at a constant speed. The holder 28 also serves to inflate the tubular textile jacket 7 fed in a deflated state. Usually, a preheating device 32 is provided between the rollers 31 and the evacuation device 16 for preheating the jacket 7 passing therethrough with hot air entering from a port 33 and going out from a port 33'. Also provided downstream of the lower end of the shaft 15 is a water bath 34 for cooling the jacket 7 coated with the laminated layers of the synthetic resins. In the bath 34 a roller 36 is positioned so that the jacket 7 passes about the roller 36 and moves out of the bath 34 through water 35 as an inert cooling medium. In place of the water bath 34, a cooling chamber (not shown) may be positioned where the jacket 7 is passed in counterflow with a stream of a cooling air or inert gas to accelerate solidification of the synthetic resins coated on the jacket. A tubular lining material thus manufactured is conveyed through a guide roller 37 and a belt conveying device 38 and wound on a shaft 39 of a take-up reel 40.

On the other hand, the tubular textile jacket 7 is supplied in a flattened state from a take-off reel 41 of a supply coil 42 through a guide roller 43 and inflated in a cylindrical form by the holder 28 in a bullet form and fed by the action of a pair of the feed rollers 31 along the rod 27 passing through the preheating device 32. The jacket is further inflated to circular in cross section by the sealing discs 20 and 21. In the subsequent coating process, the jacket 7 is maintained in completely inflated state by the mandrel 13 and the discs 25 against the evacuation by the evacuation device 16 so that the thermoplastic synthetic resins are applied evenly onto the external surface of the tubular textile jacket 7.

Figure 4:
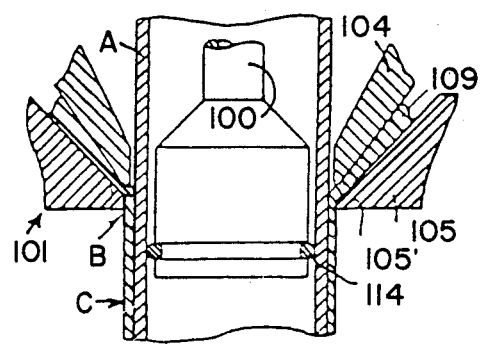
FIG. 4 is a schematic section view of a conventional extruder.

In FIG. 4 showing an enlarged fragmentary section of a conventional extrusion device 101 for a single synthetic resin, a lower part of an annular extrusion nozzle 105 is projected to from a projected portion 105' positioned closely to the tubular textile jacket in a portion A so that a thermoplastic resin 109 discharged from the nozzle is squeezed between the external surface of the jacket in the portion B and the projected portion 105' whereby a part of the synthetic resin is allowed to penetrate into interstices formed in the fabric structure of the textile jacket 7. The remaining part of the synthetic resin is applied onto the external surface of the jacket and form a coating on the jacket in a portion C. The shaft 100 may have a hollow structure and in this case it may extend downwardly beyond the mandrel to evacuate the interior of the jacket 7 in the portion C. An O-ring 114 functions as a sealing member when the evacuation is applied. A notch is formed in a an upper part 104 of the nozzle so that a relatively large amount of the synthetic resin is discharged from the nozzle and squeezed between the descending jacket and the projecting portion 105'.

Figure 5:
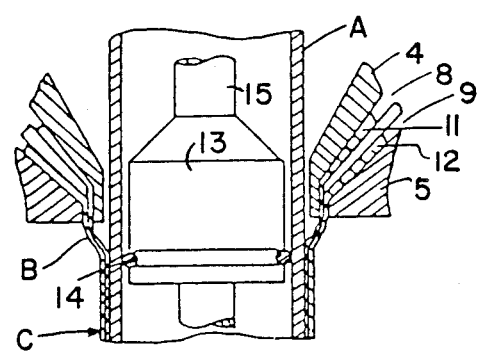
FIG. 5 is a schematic section view of an example of the extruder involved in the apparatus of the present invention as shown in FIG. 3.

In FIG. 5 showing an enlarged fragmentary section of an extrusion device of the present invention which can extrude two synthetic resins 11 and 12 at the same time through the passages 8 and 9, respectively, an inner cylindrical member 4 is extended and oriented downwardly so that the synthetic resins 11 and 12 discharged from the annular nozzle 10 descend as a laminar flow parallel with the descending jacket inflated in a portion A by the mandrel 13. Thus, the jacket is not yet brought into contact with the laminar flow of the synthetic resins in a portion B. The jacket in a portion C confined from the portion B by the O-ring 14 is evacuated through the hollow evacuation shaft 15 extending downwardly through the mandrel 13 whereby the laminar flow of the synthetic resins is allowed to contact superficially with the external surface of the tubular textile jacket.

Figure 8:
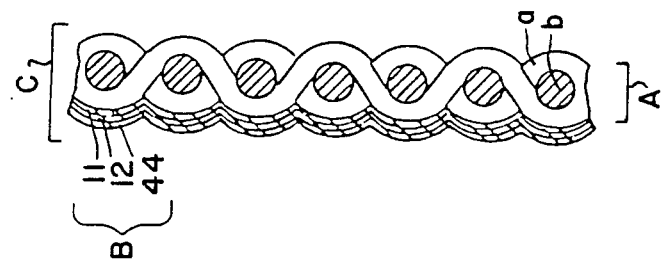
FIG. 8 is a similar view to FIG. 6 but showing the state of adhesion of the synthetic resins to the tubular textile jacket in case of another extruder involved in the apparatus of the present invention.
Figure 7:
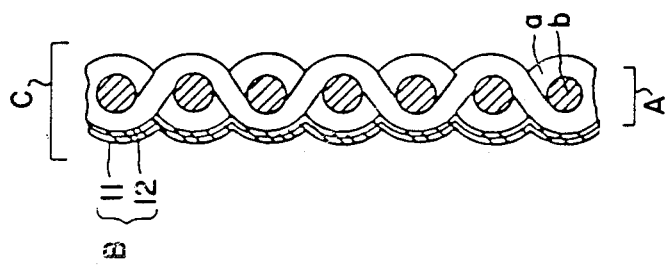
FIG. 7 is a similar view to FIG. 6 but showing the state of adhesion of the synthetic resins to the tubular textile jacket in case of using the extruder involved in the apparatus of the present invention.
Figure 6:
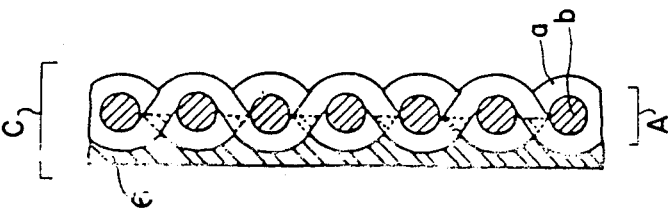
FIG. 6 is a schematic fragmentary longitudinal section view showing the state of adhesion of the synthetic resin to the tubular textile jacket in case of using a conventional extruder as shown in FIG. 4.

FIGS. 6, 7 and 8 are schematic enlarged fragmentary longitudinal section views showing the state of adhesion of the synthetic resin to the external surface of the tubular textile jacket, among which FIG. 6 shows that case obtained by using a conventional extruder.

In FIG. 6, the tubular textile jacket A woven with the warps a and the weft b is impregnated fully with the synthetic resin in such manner that the resin 6 is forced to penetrate deeply into the interstices of the fabric structure of the textile jacket, as shown by the dotted lines. Thus, the resultant tubular lining material becomes poor in flexibility and is hardly evaginated within a pipe line unless a higher fluid pressure be applied. The use of such a high pressure often damages the quality of the lining material. In addition, the space for absorbing a binder becomes smaller, thus resulting in such a drawback that the adhesion of the lining material onto the inner surface of a pipe line becomes inferior to cause peeling of the lining material. As shown in FIG. 6, the thickness of the resin reaches a half of the total thickness of the resin-coated tubular textile jacket C.

In FIG. 7 showing the case of applying two layers of the synthetic resins onto the external surface of the tubular textile jacket wherein A, C, a and b have the same meaning as given in FIG. 6, a resinous coating B composed of an inner layer of the thermoplastic polyurethane elastic resin 11 and an outer layer of the thermoplastic polyester elastic resin 12. As the resins 11 and 12 are extruded simultaneously as a laminar flow by the extruder as shown in FIG. 5, the coating B is superficially attached to the external surface of the jacket A. Because of good adhesion of the resin 11 to the jacket A and to the resin 12 however, the coating B is strongly bound with the jacket A without damaging flexibility of the jacket A.

In FIG. 8 showing the case of applying three layers of the synthetic resins onto the external surface of the tubular textile jacket wherein A, B, C, a, b, 11 and 12 have the same meanings as given in FIG. 7, an intermediate layer 44 composed of an equiproportion of the resin 11 and the resin 12, and the thickness of the coating B is somewhat enlarged to show the triple layer structure, the layers are formed in a similar manner to that in FIG. 7 by using a triple extruder similar to the double extruder as shown in FIG. 5. In this case, the coating B is superficially attached to the external surface of the jacket A without damaging flexibility of the jacket A. Adhesion of the coating is much more improved in this example.

In the apparatus of the present invention, the viscous thermoplastic resins 11 and 12 extruded onto the external surface of the jacket 7 still have a high temperature sufficient to be plastically movable. Since the spaces 26 are evacuated by the evacuation device 16, the resins are attached superficially onto the surface of the jacket 7 but are not penetrate into the jacket 7 because of their high viscosity to form a coating superficially on the jacket. The length of the evacuation shaft 15 downstream of the mandrel 13 is thus suitably controlled according to the viscosity, temperature and other conditions. It is preferable that the conveying speed of the jacket 7 by the belt conveying device 38 is substantially equal to or slightly higher than the feeding speed of the jacket by the feed rollers 31. If the conveying speed is too high, the frictional resistance between the portion B of the jacket 7 and the mandrel 13 and the discs 25 will be increased. On the other hand, if the conveying speed is too low, the portion A of the jacket 7 will sag to provide uneven thickness of the coating layer. The feed rollers 31 may be eliminated and the jacket 7 can be pulled only by the belt conveying device 38.

Preferred Embodiments

In preferable examples of the tubular lining material for reinforcing a pipe line having a nominal diameter of 150 mm, a tubular textile jacket was made of 444 warps, each comprised of three 1000 denier polyethylene terephthalate multi-filament yarns and a weft made by twisting a 1100 denier polyethylene terephthalate multi-filament yarn and a 208 polyethylene terephthalate spun yarn and picked up at 62 pick count/10 cm. The tubular textile jacket thus manufactured was used in the following three examples and a comparative example.

In one example, the following coating was applied onto the tubular textile jacket, using the apparatus as shown in FIG. 1;

the outer layer: a thermoplastic polyester elastic resin (Pelprene 150M available from Toyobo Co., Japan)

the inner layer: a thermoplastic polyurethane elastic resin of polyether type (Elastoran E375 available from Nihon Elastoran, Japan)

Thickness of the coating: 0.4 mm in average (the outer layer/the inner layer=1/1).

In another example, the following coating was applied onto the tubular textile jacket in a similar manner;

The outer layer: a thermoplastic polyester elastic resin plus a thermoplastic polyurethane elastic resin (the same resins as those used in the above; a blend ratio=4/1)

The inner layer: a thermoplastic polyurethane elastic resin plus a thermoplastic polyester elastic resin (the same resins as those used in the above; a blend ratio=4/1)

Thickness of the coating: 0.4 mm in average (the outer layer/the inner layer=1/1).

In still another example, the following coating was applied onto the tubular textile jacket in a similar manner using an extruder for three resins:

The outer layer: a thermoplastic polyester elastic resin (the same resin as that used in the above)

The intermediate layer: a thermoplastic polyester elastic resin plus a thermoplastic polyurethane elastic resin (the same resins as those used in the above; a blend ratio=1/1)

The inner layer: a thermoplastic polyurethane elastic resin (the same resin as that used in the above)

The thickness of the coating: 0.4 mm in average (the outer layer/the intermediate layer/the inner layer=2/1/1/).

In a comparative example, the following coating was applied onto the tubular textile jacket, using the extruder as shown in FIG. 4:

The coating: a thermoplastic polyester elastic resin (the same resin as used in the above)

The thickness of the coating: 0.4 mm in average.

In an actual pipe lining treatment for the pipe line of 150 mm in a nominal diameter according to the method as disclosed in U.S. Pat. No. 4,334,943, the following results were obtained which are shown in the following table:

TABLE

| Coating | Example 1 two layers | Example 2 two layers | Example 3 three layers | Comparative one layer |
|---|---|---|---|---|
| Peeling strength between the coating and the jacket (Kg/cm w) | 3–4 | 2–3 | 3–4 | 1–2 |
| Peeling strength after curing of the binder (Kg/cm w)** | 8 | 4–5 | 8 | 1–2 |
| Flexibility (Pressure for evagination) *1 (Kg/cm²) | 0.4 | 0.45 | 0.4 | 0.8 |
| Delamination of the coating *2 | occur | none | none | — |

*1 An air pressure of compressed air necessary for causing evagination of the tubular lining material within the pipe line of 150 mm in diameter
*2 A crumpling test after soaking in 20% benzene - 80% methanol for 24 hours.
**An epoxy type binder As is evident from the above tests, the best result was obtained in the sample having the triple layer coating. The tubular lining material of the present invention were found preferable as they are excellent in flexibility and peeling strength.

As many apparently widely different embodiments of the present invention may be made without departing from the spirit and scope thereof, it is to be construed that the present invention is not limited to the specific embodiments thereof except as defined in the appended claims.

What is claimed is:

1. An apparatus for coating a tubular textile jacket in the manufacturing of a tubular lining material for pipe lines which comprises an annular extrusion head having multiple extruders each with a downwardly opened annular nozzle at the lower end thereof, each extruder communicating with said corresponding nozzle through concentric annular passages capable of simultaneous extruding plural, separately distinct synthetic resins annularly in the form of laminated layers on the external surface of a tubular textile jacket, a mandrel located on the central axis of said apparatus, spaced from said annular nozzles, which has an outer diameter substantially equal to or slightly smaller than the inner diameter of said tubular textile jacket, a means for evacuating the interior of said tubular textile jacket downstream of said mandrel said evacuation means including a hollow shaft extending through said mandrel, a lower end portion of said shaft extending downward beyond said mandrel having formed therein at least one hole for communicating between the interior of said tubular textile jacket and the interior of said hollow shaft, and at least one disc laterally mounted on said lower end portion of said shaft to maintain said tubular textile jacket in an inflated condition, said mandrel and said at least one disc defining an evacuated space therebetween, the interior of said hollow shaft communicating with a vacuum source located at an upstream section of said annular extrusion head, means for solidifying said synthetic resins in the form of said laminated layers coated on said tubular textile jacket and means for introducing said tubular jacket to and withdrawing said laminated tubular jacket from said manufacturing apparatus.

2. The apparatus of claim 1, wherein said downstream evacuation means comprises a plurality of axially spaced discs mounted on said lower portion of said hollow shaft and a plurality of holes are formed in said shaft intermediate between adjacent discs for communication between the exterior and interior of said hollow shaft.

3. The apparatus of claim 1, wherein an upper end portion of said hollow shaft upwardly extending from said mandrel within said tubular textile jacket is formed at said upstream section of said annular extrusion head with a hole for communicating between the interior of said shaft and a space within said tubular textile jacket defined by a pair of axially spaced sealing discs laterally mounted on said upper end portion of said hollow shaft, said space communicating with said vacuum source through said tubular textile jacket.

4. An apparatus for coating a tubular textile jacket in the manufacturing of a tubular lining material for pipe lines which comprises in combination:

an upstream evacuation section encompassing a vacuum chamber formed by a pair of axially spaced sealing discs defining a space within said tubular textile jacket communicated with a vacuum source;

an annular coextrusion head having multiple extruders vertically positioned and securely mounted to said evacuation section, said coextrusion head including inner and outer cylindrical members with concentrically formed annular passages therein which communicate said extruders with an annular nozzle at the lower ends of said inner and outer cylindrical members, simultaneously extruding plural, separately distinct synthetic resins annularly in the form of laminated layers on an external surface of said tubular textile jacket;

a mandrel located on a central axis of said apparatus within said tubular textile jacket where said annular passages communicate with said annular nozzle, said mandrel having an outer diameter substantially equal to or slightly smaller than an inner diameter of said tubular textile jacket;

a downstream plural zone pressurizing section at the lower end of said annular coextrusion head; and a hollow shaft which extends the entire length of said apparatus on said central axis thereof from said downstream plural zone pressurizing section through said mandrel upward within said coextrusion head to terminate at its upper end in said evacuation section, that portion of said hollow shaft between said axially spaced sealing discs of said evacuation section having a hole therein for communicating between the interior of said hollow shaft and said defined space within said tubular textile jacket with said vacuum source, wherein within said downstream plural zone pressurizing section said hollow shaft has mounted thereon a plurality of axially spaced discs with holes formed in said shaft intermediate between adjacent discs communicating between the exterior and interior of said shaft and said vacuum source by way of said upstream evacuation section.

5. The apparatus of claim 4, wherein one of said annular passages within said coextrusion head is defined by said inner and outer cylindrical members and another of said annular passages is defined within said outer cylindrical member.

6. The apparatus of claim 4, further including means for solidifying said synthetic resins in the form of said laminated layers coated on said tubular textile jacket and means for introducing said tubular jacket to and withdrawing said laminated tubular jacket from said coating and manufacturing apparatus.

* * * * *